United States Patent [19]
Anson

[11] Patent Number: 5,472,768
[45] Date of Patent: Dec. 5, 1995

[54] TUBULAR SECTION ROLLED UP FROM A FLEXIBLE SHEET

[76] Inventor: Andrew P. Anson, 420 Prince Albert Avenue, Westmount, Quebec, Canada, H3Y 2P5

[21] Appl. No.: 144,626

[22] Filed: Nov. 1, 1993

Related U.S. Application Data

[63] Continuation of Ser. No. 33,209, Mar. 18, 1993, abandoned.

[51] Int. Cl.⁶ .................................................... B65G 11/10
[52] U.S. Cl. .................. 428/131; 428/36.9; 428/139; 428/99; 428/100; 428/81; 428/54; 428/57; 138/157; 138/158; 138/159; 138/160; 138/168; 193/33; 193/34; 193/25 E; 193/25 A; 193/25 R
[58] Field of Search .................. 428/36.9, 139, 428/131, 99, 100, 81, 54, 57; 138/157, 158, 159, 160, 168; 193/33, 34, 25 E, 25 A, 25 R

[56] References Cited

U.S. PATENT DOCUMENTS

| | | | |
|---|---|---|---|
| D. 328,174 | 7/1992 | Watkins | 254/31 |
| 596,686 | 1/1898 | Thompson | 193/34 |
| 773,596 | 11/1904 | Roenius | 193/34 |
| 1,013,504 | 2/1912 | McNamara | 193/34 |
| 1,538,240 | 6/1924 | Claudepierre | 193/34 |
| 2,039,886 | 9/1935 | Cohn | 138/158 |
| 2,463,593 | 6/1945 | Boardman | 138/159 |
| 2,915,088 | 4/1957 | Felter | 138/157 |
| 2,997,150 | 8/1961 | Emanuelson | 193/22 |
| 3,182,903 | 5/1965 | Marton | 232/45 |
| 3,298,721 | 1/1967 | Wiley | 138/159 |
| 3,577,608 | 5/1971 | Texler | 24/221 |
| 3,627,090 | 12/1971 | Dickey | 193/34 |
| 3,807,540 | 4/1974 | Boulet | 193/1 |
| 3,949,850 | 4/1976 | Schumm | 405/216 |
| 4,023,374 | 5/1977 | Colbert et al. | 138/159 |
| 4,306,821 | 12/1981 | Moore | 52/746 |
| 4,543,764 | 10/1985 | Kozikowski | 193/16 |
| 4,640,403 | 2/1987 | McDermott | 193/34 |
| 4,697,957 | 10/1987 | Hellmers | 47/23 |
| 5,060,416 | 10/1991 | Rohde | 405/216 |
| 5,086,902 | 2/1992 | Dunnigan | 193/27 |

FOREIGN PATENT DOCUMENTS 1025054  2/1985  United Kingdom .

*Primary Examiner*—William P. Watkins, III
*Attorney, Agent, or Firm*—Ronald S. Kosie; Robert Brouillette

[57] ABSTRACT

The present invention relates to a tubular section which may be constructed from a sheet having a pair of opposed edges. The opposed edges are releasably connectable such that the section may be stored in a relatively flat configuration. The screw fasteners used to connect the edges together may be restrained from rotation using for example a stringer element appropriately stabilised relative to the fasteners.

18 Claims, 9 Drawing Sheets

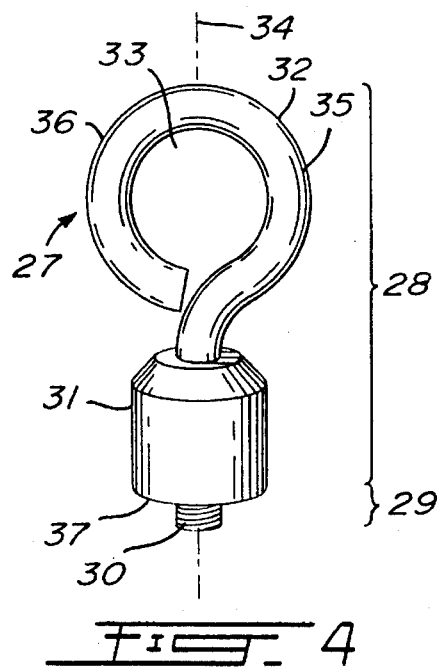
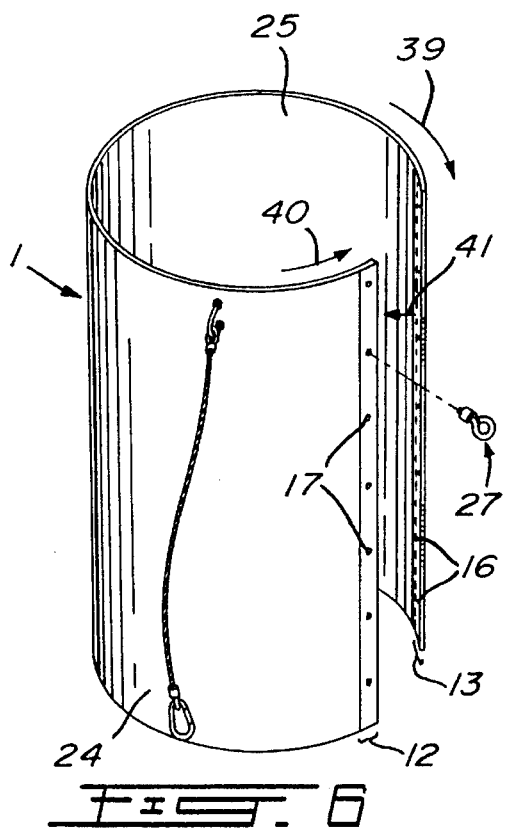
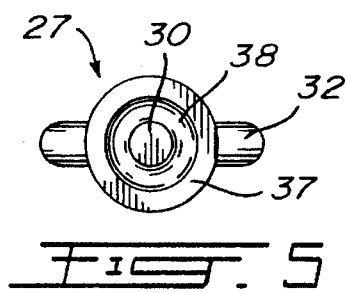
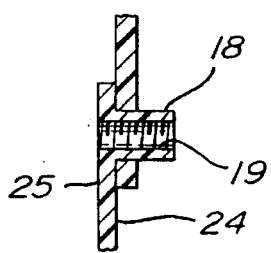
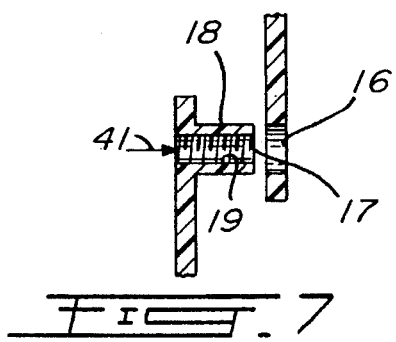
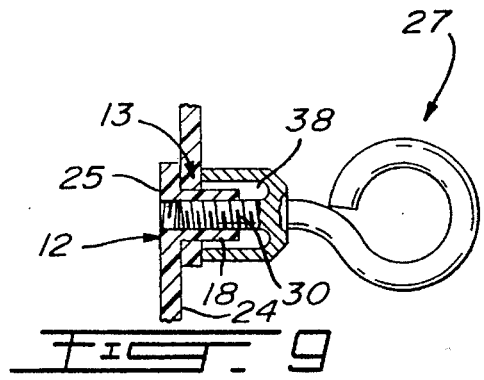

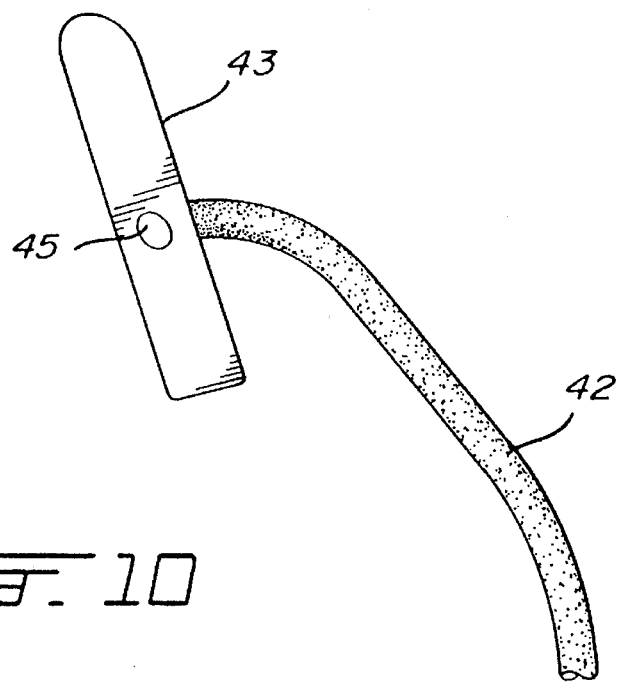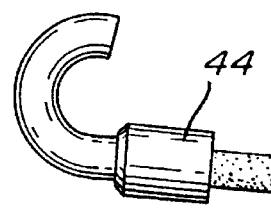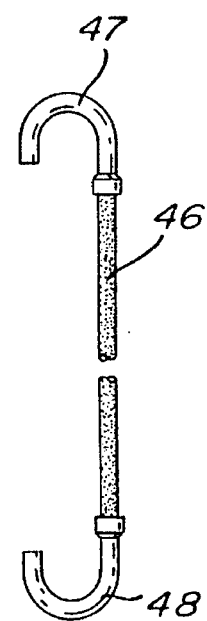

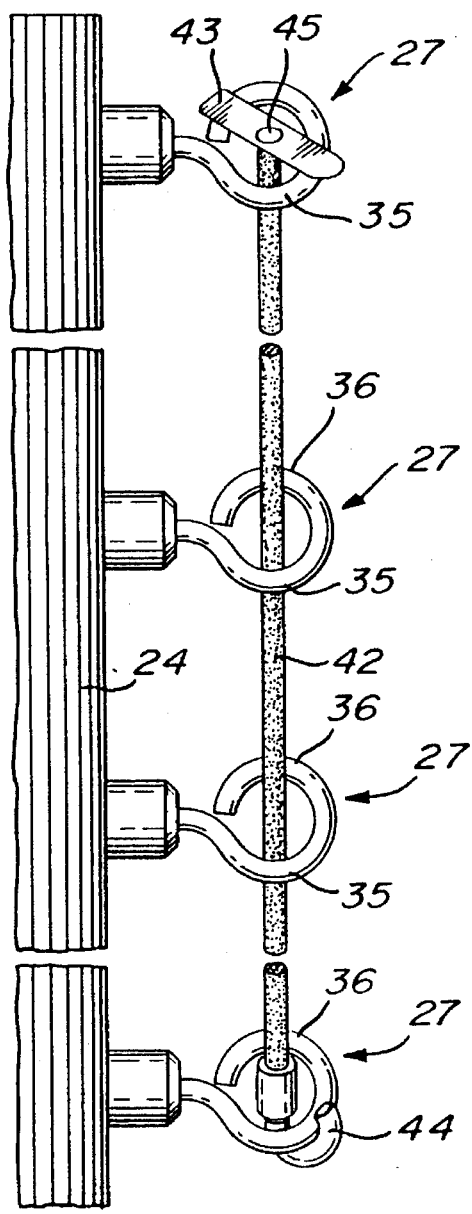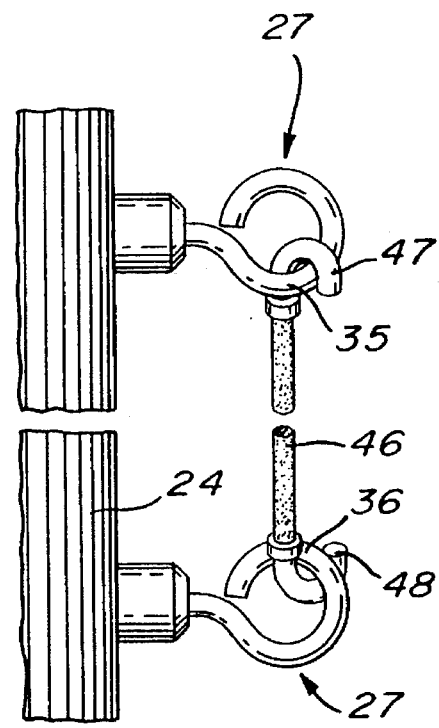

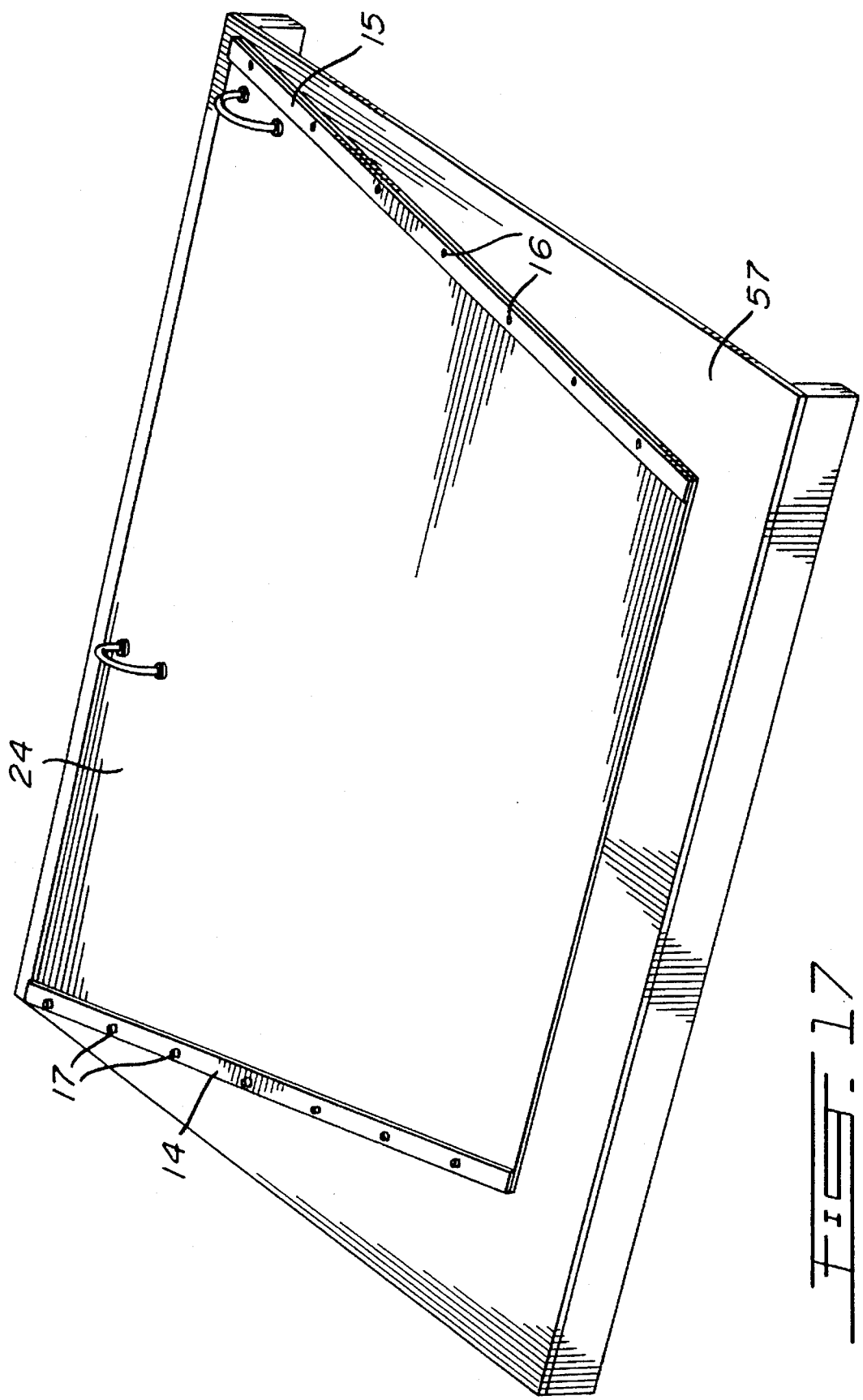

TUBULAR SECTION ROLLED UP FROM A FLEXIBLE SHEET

This is a continuation application of application Ser. No. 08/033,209, filed Mar. 18, 1993, abandoned.

The present invention relates to a kit for the construction of a tubular section which may, if desired, be used for a debris conveyor chute made up of a plurality of such tubular sections.

BACKGROUND OF THE INVENTION

Debris conveyor chutes made of a plurality of detachable chute sections are known; see for example U.S. Pat. No. 3,627,090 the entire contents of which are incorporated herein by reference; see also U.K design no. 1,025,054. Such chutes are usually erected outside of and adjacent the wall of a building so as to provide a mechanism whereby waste materials may be easily and safely disposed of by being directly conveyed to a disposal bin at the base of the building.

However, as the height the conveyor chute is required to reach increases so does the number of chute sections which are necessary in order to construct the debris chute. This may pose a significant storage and transportation problem if the chute sections are integral built units. Such units a bulky and thus require a relatively larger volume of storage area and may necessitate frequent trips between the storage site and the work site in order to accumulate enough chute sections to make a debris conveyor of the desired height.

This storage and transportation problem may be meet if each of the chute sections may be broken down into a sheet member from which the tubular chute may be reconstructed. Such rebuildable chute sections may be built by rolling up opposed edges of the sheet to give the desired tubular form and using ordinary nut and bolt fasteners to join the opposed edges together; the reverse being done in order to recover the (flat) sheet to facilitate storage and transport, i.e. minimise the space occupied by the material making up the chute. However, a problem to be faced is how to maintain in place either the nut or bolt while engaging or disengaging the fastener form the sheet; usually this means that a person must be placed on the inside of the tubular section who will then cooperate with a person on the outside so as to remove the nuts and bolts, i.e. the person inside may merely hold on to a nut (using a wrench, etc.) while the person outside turns the bolt. This is a cumbersome procedure and may be expensive in it requires two persons to do the work. Another problem with ordinary nut and bolt fasteners relates to the vibration energy to which the chute sections are exposed during use. If ordinary nuts and bolts are used they will have a tendency to loosen with time and even fall out; if enough bolts and nuts fall out the overall structural integrity of the chute can be compromised. Lock washers may be used but they have a tendency to wear due to the repeated taking apart and rebuilding of the chute sections.

Accordingly, it would be advantegeous to have a tubular section (suitable for chutes) which may be made from a sheet and be readily built and broken down.

It would, in particular, be advantageous to have a debris conveyor chute system which is built from sheets which are relatively easy to connect and disconnect along opposed edges thereof.

It would also be advantageous to be able to have a tubular section whereby the screw interlock means may be effectively restrained from screw disengagement due to vibration, or otherwise.

SUMMARY OF INVENTION

Thus in accordance with a general aspect the present invention provides a kit for the construction of a rebuildable open-ended tubular section (e.g. for a debris conveyor chute, said debris conveyor chute comprising a plurality of such tubular chute sections), said kit comprising
a flexible sheet,
said sheet having a pair of opposed edge members,
said sheet being configured to be rolled up such that said edge members are able to be disposed in an adjacent position wherein said sheet defines an open-ended tubular section, said tubular section having an interior side and an exterior side, and
screw interlocking means for releasably joining said first and second edge members together in said adjacent position,
said screw interlocking means comprising
a screw fastener,
a first element, one of said edge members comprising said first element,
and a second element, the other of said edge members comprising said second element,
the screw fastener comprising a head portion and a screw threaded shank portion, said shank portion having a longitudinal axis,
the first element comprising a first opening,
the second element comprising a second opening,
the first opening having a screw thread for screw engagement with the screw threaded shank portion of the screw fastener,
the second opening being sized smaller than the head portion of the screw fastener,
said first and second elements being configured and disposed such
that the second opening is alignable with the first opening, so as to define an aligned opening for holding the shank portion of the screw fastener, and
that the second element may be disposed on the exterior side of said tubular chute and the shank portion of the screw fastener may enter the aligned opening so as to dispose said second element between the first element and the head portion of the screw fastener when the shank portion of the screw fastener is held in the aligned opening,
characterized
in that said head portion includes an axially offset member for engaging rotational restraint means for inhibiting the rotation of the screw fastener when the screw fastener is in screw engagement with the first opening,
said axially offset member being axially offset relative to the longitudinal axis of the shank portion of the screw fastener.

A kit may include rotational restraining means for inhibiting the rotation of the screw fastener when the screw fastener is in screw engagement with the first opening. The restraining means may take any form whatsoever provided that it is able to engage the axially offset member of the screw fastener so as to inhibit the rotation of the fastener.

The rotational restraining means, for example, comprise
a stringer element, and
immobilisation means for immobilising said stringer element relative to said one or more screw fasteners.

In this case the head portion of the screw fastener, said stringer element and said immobilisation means may be configured such that, when the threaded shank portion of the screw fastener is in screw engagement with the first opening, the stringer element may be disposed such that said offset member is able to engage said stringer element so as to restrain rotation of the threaded shank portion of the fastener.

The screw fastener may for example be an eyebolt, the eyebolt comprising a head portion and a screw threaded shank portion, the head portion of the eyebolt having a loop member defining an orifice.

The screw interlocking means may comprise one or more screw fasteners and one or more pairs of said first and second elements. If only one screw fastener is used the edge members may be configured to engage in tongue and groove fashion in order to enhance the joining thereof in the adjacent position. However, a plurality of screw fasteners may be used especially if the edge members merely abut one another.

The stringer element may be configured to freeze up one or more screw fasteners. Two or more of such stringer elements may be used.

The screw interlocking means may, thus, for example, comprise a plurality of said screw fasteners, and a plurality of pairs of said first and second elements, said screw interlocking means being configured such that for each pair of said elements, one edge member comprises the first element of the pair and the other edge member comprises the second element of the pair; each screw fastener may comprise an eyebolt as described above.

A head portion of a screw fastener may include a plurality of axially offset members.

The second opening may be sized larger than the shank portion of the screw fastener; it will of course still be smaller than the head portion thereof.

Alternatively, the second opening may also have a screw thread for screw engagement with the screw threaded shank portion of the screw fastener.

A portion of the first opening may be defined by a sleeve member which is configured such that, when the edge members are disposed in said adjacent position, the sleeve member extends into said second opening. The sleeve member may in particular be configured such that, when the edge members are disposed in said adjacent position, the sleeve member extends through and projects out of said second opening.

The head portion of said screw fastener may have an annular abutment surface disposed about said shank portion, said head portion being configured such that when the shank portion is screwed into the aligned opening, the abutment surface may abut the second element and urge the second element against the first element, so as to clamp said second element between the head portion and the first element.

In accordance with another aspect, the present invention provides a kit for the construction of a rebuildable open-ended tubular section (e.g. for a debris conveyor chute, said debris conveyor chute comprising a plurality of such tubular sections), said kit comprising
a flexible sheet,
said sheet having a pair of opposed edge members,
said sheet being configured to be rolled up such that said edge members are able to be disposed in an adjacent position wherein said sheet defines an open-ended tubular section, said tubular section having an interior side and an exterior side, and screw interlocking means for releasably joining said first and second edge members together in said adjacent position, said screw interlocking means comprising
a plurality of screw fasteners, and
a plurality of pairs of first and second elements, said screw interlocking means being configured such that for each pair of said elements, one edge member comprises the first element of the pair and the other edge member comprises the second element of the pair, each screw fastener comprising a head portion and a screw threaded shank portion, said shank portion having a longitudinal axis, each first element comprising a first opening, each second member comprising a second opening, each first opening having a screw thread for screw engagement with the screw threaded shank portion of a respective screw fastener, each second opening being sized smaller than the head portion of a respective screw fastener, the first and second elements of each of said pairs of elements being configured and disposed such
that the second opening is alignable with a respective first opening so as to define an aligned opening for holding the shank portion of a respective screw fastener, and
that the second element may be disposed on the exterior side of said tubular chute and the shank portion of a respective screw fastener may enter the aligned opening so as to dispose said second element between the respective first element and the head portion of the respective screw fastener when the shank portion of said respective screw fastener is held in the aligned opening, characterized
in that one or more screw fasteners has a pair of opposed, spaced apart, axially offset members projecting from the head portion thereof, said axially offset members being axially offset relative to the longitudinal axis of the shank portion of a respective screw fastener, in that said kit includes
rotational restraint means for inhibiting the rotation of said one or more of screw fasteners when the shank portion thereof is in screw engagement with a respective first opening, said rotational restraint means being able to engage either or both offset members of a said pair of offset members of a screw fastener for inhibiting the rotation thereof.

As mentioned above, rotational restraint means may comprise a stringer element, and immobilisation means for immobilising said stringer element relative to said one or more screw fasteners, and the head portion of said one or more screw fasteners, said stringer element and said immobilisation means may be configured such that, when the threaded shank portion of said one or more screw fasteners is engaged in a respective aligned opening, the stringer element may be disposed between the pair of axially offset members of said one or more screw fasteners such that each offset member of a said pair of offset members is able to engage said stringer element so as to restrain rotation of the threaded shank portion of a respective screw fastener.

The screw fasteners may comprise one or more eyebolts.

Each eyebolt may as mentioned above comprise a head portion and a screw threaded shank portion, the head portion of each eyebolt having a loop member defining an orifice.

The second openings may as mentioned be sized larger than the shank portion of the screw fastener. Alternatively, one or more of the second openings may have a screw thread for screw engagement with the screw threaded shank portion of a respective fastener.

A portion of each first opening may as mentioned be defined by a sleeve member which is configured such that, when the edge members are disposed in said adjacent position, the sleeve member extends into the respective second opening. The sleeve member may be configured such that, when the edge members are disposed in said adjacent position, the sleeve member extends through and projects out of said respective second opening.

The head portion of each of said screw fasteners may have an annular abutment surface disposed about said shank portion. The head portion of each screw fastener, may be configured such that when the shank portion of the screw fastener is screwed into a respective aligned opening, said abutment surface may abut a respective second element and urge said second element against the respective first element, so as to clamp said second element between said head portion and said first element.

In accordance with the present invention the first and second elements may constitute separate and distinct elements or else they may be more or less completely integrated into the structure of an edge member.

Thus in accordance with another particular aspect the present invention provides a kit for the construction of a rebuildable open-ended tapered tubular section (e.g. for a debris conveyor chute, said debris conveyor chute comprising a plurality of such tubular chute sections), said kit comprising
  a flexible sheet,
    said sheet having a first edge member and an opposed second edge member, said sheet being configured to be rolled up such that said edge members are able to be disposed in an overlapping position wherein said sheet defines an open-ended tapered tubular section, said tubular section having an interior side and an exterior side, and
  screw interlocking means for releasably joining said first and second edge members together in said overlapping position,
  said screw interlocking means comprising
    a plurality of screw fasteners,
    a plurality of first openings, said first openings being defined by and being disposed along one of said edge members,
    and a plurality of spaced apart second openings, said second openings being defined by and being disposed along the other of said edge members,
    each screw fastener comprising a head portion and a screw threaded shank portion,
    each first opening having a screw thread for screw engagement with the screw threaded shank portion of a respective screw fastener,
    each second opening being sized smaller than the head portion of a respective screw fastener,
    said first and second edge members being configured such,
      that each of the second openings is able to be aligned with a respective first opening so as to define a respective aligned opening for holding the shank portion of a respective screw fastener, and
      that the second edge member may be disposed on the exterior side of said tubular chute and the shank portion of each screw fastener may enter a respective aligned opening so as to dispose said second edge member between the first edge member and the head portion of each of the screw fasteners when the shank portion of each of the screw fasteners is held in a respective aligned opening,
characterized
  in that said screw fasteners comprise one or more eyebolts, each eyebolt comprising a head portion and a screw threaded shank portion, the head portion of each eyebolt having a loop member defining an orifice, and
  in that said kit includes
    rotational restraint means for inhibiting the rotation of one or more of said eyebolts when the shank portion thereof is in screw engagement with a respective first opening, said rotational restraint means being able to engage the loop member defining the orifice of said one or more of eyebolts for inhibiting the rotation thereof.

The rotational restraint means may as alluded to above particularly comprise
  a stringer element, and
  immobilisation means for immobilising said stringer element relative to said one or more eyebolts,
and the head portion of each of said one or more eyebolts, said stringer element and said immobilisation means are configured such that, when the threaded shank portion of said one or more eyebolts is engaged in a respective aligned opening,
  the stringer element may be threaded through or otherwise engage (e.g. hook) the orifice of said one or more eyebolts so as to restrain rotation of the threaded shank portion of said one or more eyebolts in screw engagement with a respective first opening.

The stringer element may be configured as a string, a cord, a cable, a rope, a wire, a rod or any other type of elongated (plastics) material. It may be flexible and stretchable as well; alternatively it may be rigid. It may terminate at opposed ends with hooking means configured to engage the orifice of an eyebolt type screw fastener; the axially offset member may itself be hook shaped for engagement with the hooks of the stringer.

Thus the stringer element may for example, have opposed ends, and said connection means comprises hook means provided at each end of the stringer element for engaging an orifice of a respective eyebolt.

The head portion of each of said eyebolts has an annular abutment surface disposed about said shank portion and wherein for each eyebolt, the head portion thereof is configured such that when the shank portion of the eyebolt is screwed into a respective aligned opening, said abutment surface may abut a respective second element and urge said second element against the respective first element, so as to clamp said second element between said head portion and said first element.

The present invention also provides for a kit for the construction of a debris conveyor chute which comprises a plurality of the flexible sheets as described herein and screw interlocking means for each of the sheets such that a plurality of tubular chute sections may be made from the kit. The kit may also include rotation restraint means for the assembled chute sections also as described herein; if desired two or more chute sections may share a single rotational restraint means.

The immobilisation means may take on any form as desired provided that the stringer is able to restrain the rotation of the shank by engaging the axially of set member(s).

The sheet may be made of any suitavble (e.g. chute) material provided that it is flexible so as to allow the formation of the tubular form and also a return to the relatively flat form.

The sheet may be trapezoidal, square, or have any other form whatsoever; if square, the tubular form will be a hollow cylinder of constant cross-section.

BRIEF DESCRIPTION OF THE DRAWINGS

In drawings which illustrate example embodiments of the present invention,

FIG. 4 is a side view of an example eyebolt for use as a screw fastener in conjunction with the sheet of FIG. 1 so as to join the first and second edge members of the sheet together in overlapping fashion and form a tapered tubular chute section;

FIG. 5 is a bottom view of the eyebolt shown in FIG. 4;

FIG. 6 is a perspective view of the sheet of FIG. 1 in the process of being rolled up into a tubular form with the first and second edge members in overlapping position with the second edge member on the exterior side of the finished tubular chute section;

FIG. 7 is a schematic representation of a first opening (illustrated in FIG. 2) being aligned with a respective second opening for defining an aligned opening for holding the shank portion of an eyebolt as shown in FIG. 4;

FIG. 8 is a schematic representation showing the sleeve member (illustrated in FIG. 1) of the first element extending through and projecting from the second opening on the exterior side of the chute section;

FIG. 9 is a schematic representation of the pair of overlapping first and second members of FIG. 8 with the shank of the eyebolt in screw engagement with the sleeve member so as to pinch the second element between the head porion of the eyebolt and the first edge member;

FIG. 10 illustrates the form of an example stringer element provided with engagement means for immobilising the stringer relative to screw fasteners such as the eyebolt of FIG. 4;

FIG. 11 illustrates another example of a stringer element and immobilisation means;

FIG. 12 illustrates the use of a stringer element as shown in FIG. 10 so as to restrain rotation of the shanks of eyebolts;

FIG. 13 illustrates the use of the stringer element of FIG. 11 to restrain rotation of eyebolts;

FIG. 17 shows a flexible sheet of FIG. 1 lain on a pallet for storage or for transport to a work site;

DETAILED DESCRIPTION OF THE INVENTION

Figure 1:
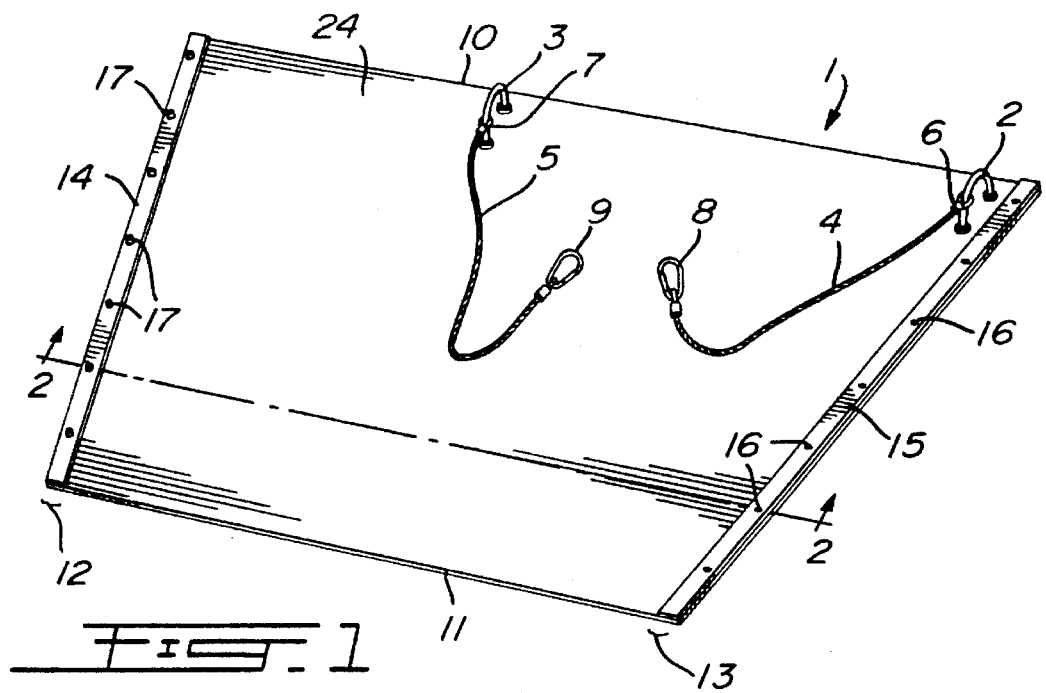
FIG. 1 is a perspective view of a flexible sheet for forming a tapered tubular chute section.
Figure 2:
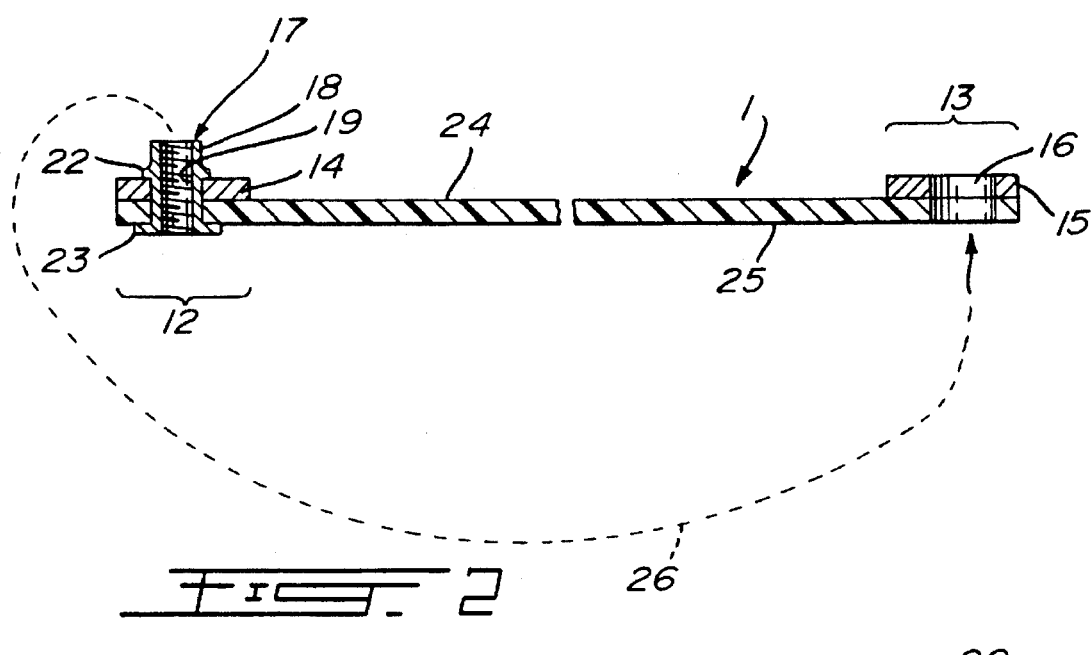
FIG. 2 is a cross sectional view along 2—2 of FIG. 1.

Turning to FIGS. 1 and 2, these figures illustrate an example flexible sheet 1 for forming a tapered tubular chute section. The sheet 1 may be made of any suitable material provide that it can be rolled up into the desired open ended tubular form. The sheet may for example be made of high molecular weight polyethylene or high density polyethylene.

The sheet 1 is provided with a pair of U-bolts 2 an 3; each of the arms of each of the U-bolts is fixed to the sheet in conventional manner whereby the sheet is pinched between a pair of nuts (not shown) engaged on each of the arms. The cable support lines 4 and 5 are attached to the U-bolts 2 and 3 by loop members 6 and 7. The cables 4 and 5 terminate in spring clips 8 and 9. The function of the cable support lines 5 and 6 will be discussed below.

The sheet 1 has a trapezoidal form. The edge portions 10 and 11 are thus essentially parallel to each other while the opposed pair of edge members, namely first edge member 12 and second edge member 13, are not parallel to each other. The edge portion 10 is longer than the edge portion 11 such that when the sheet 1 is rolled up into the tubular chute form, the circular opening defined by the edge portion 10 will be sized larger than the opening defined by the edge portion 11.

The edge members 12 and 13 each include metallic (e.g. aluminum) strips 14 and 15 which serve to reinforce these members. The second edge member 13 is provided with a plurality of spaced apart second openings which are disposed along said edge member; a number of these openings are designated with the reference numeral 16. The first edge member 12 is provided with a plurality of spaced apart first openings which are disposed along said edge member; a number of these openings are designated with the reference numeral 17.

Figure 3:
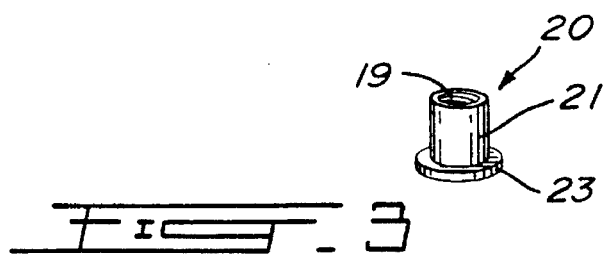
FIG. 3 is perspective view of a threaded insert used to define threaded sleeve elements for the first edge member of the sheet in FIG. 1.

Turning to FIG. 2, the first openings 17 are each defined by a sleeve member 18 which has a threaded interior 19. The sleeve members 18 are each formed from a rivet nut element which is embraced in rivet fashion in openings in the first edge member. Thus the sleeve members are formed by providing the first edge member with a series of openings for receiving threaded inserts 20 (see FIG. 3—such "threaded inserts" are available in the market place for example from AVK Industrial Products division of AVibank Manufacturing Inc, Valencia Calif., U.S.A.). Using a "blind rivet nut setting tool" by Gesipia Blindniettechnik Gmbh the threaded elements may be disposed in appropriate respective openings along the first edge member and pressure exerted on the side wall 21 so as to form a bead 22 about the periphery of the insert, the insert being secured to the first edge member by the clamping or pinching action exerted between the bead 22 and the flange 23.

The sheet 1 has a surface 24 which is destined in the finished tubular chute to essentially define the outer or exterior side of the chute section. The other opposed major surface 25 will in the finished chute section essentially define the inner or interior side of the chute. To achieve the desired tubular configuration wherein surface 24 is essentially on the outside and surface 25 is essentially on the inside, the sheet is rolled up as indicated by the arrow 26 (in FIG. 2) such that the portion of the sleeves 18 extending out of surface 24 is directed into the openings 16; see also FIG. 6. In this example the first and second edge portions will this overlap such that the second edge member is on the exterior side of the finished chute (see FIGS. 7 to 9).

The first and second edge members are to be held place by an eyebolt 27 as shown in FIGS. 4 and 5. The eyebolt has a head portion 28 and a shank portion 29. The shank portion 29 has a shank 30 which is provided with an exterior screw thread intended to mate in screw engagement with the threaded interior 19 of a respective the sleeve 18. The head portion 28 of the eyebolt 27 is provided with a base part 31 and also has a loop member 32 which defines an orifice 33. The eyebolt has a longitudinal axis 34. Thus as may be seen the loop member comprises axially offset parts indicated generally by the reference numerals 35 and 36. The parts 35 and 36 are axially offset with respect to the axis 34.

The eyebolt 27 also has an annular abutment surface 37 disposed about and spaced apart from the shank 30 by an annular space 38. The annular space 38 is configured to receive the portion of the sleeve 18 which projects out of the second opening 16 (see FIG. 9) when the first and second edge members are in the appropriate overlapping position for being joined together by a plurality of the eyebolts 27.

Turning to FIG. 6 to 9 a sheet 1 is rolled up and locked into a tubular configuration by advancing the edge members towards each other in the direction of the arrows 39 and 40. The edge members are advanced towards each other such that the second edge member 13 overlaps the first edge member 12. At this point the openings 16 and 17 are aligned with respect to each other and the edge members are advanced towards each other in the direction the arrow 41 such that each sleeve member 18 passes through a respective second opening 16 such that it extends out of the exterior side of the chute section. Then, for locking the edge members in place, as seen from FIGS. 6 and 9, the shank 30 of an eyebolt 27 is screwed, from the exterior side of the chute section, into the threaded opening of each of the sleeve members 18. The outwardly extending part of sleeve member 18 is embraced in the annular opening 38 of a respective eyebolt such that as the shank is screwed into the sleeve member 18, the abutment surface 37 of the eyebolt 27 is eventually made to push against the second edge member so as to pinch it between the abutment surface and the first edge member 12.

FIGS. 10 and 11 show examples of rotational restraint means for inhibiting the rotation of the eyebolt(s) once the eyebolt(s) is screwed in place so as to lock the first and second edge members in place.

The restraint means shown in FIG. 11 includes a stringer element 42 which is in the form of a flexible, stretchable cord or cable. The restraint means also has engagement means 43 and 44 at opposed ends of the stringer element 42; these end elements as seen from FIG. 12 serve to immobilise the stringer element with respect to screw fasteners (e.g. the loop members of eyebolts). The end element 44 is in the form of a hook for hooking onto the loop member of an eyebolt. The end element 43 is pivotally attached to the stringer element 42 by pivot connector 45; the pivot connection may for example consist of a pin fixed to end element 43 in a recess therein, the pin the passing through a looped end part of the stringer disposed in the recess.

The rotational restraint means shown in FIG. 11 includes a stringer element 46 which is also in the form of a flexible, stretchable cord or cable. The ends of the cable are provided with hooks 47 and 48 for the immobilisation of the stringer element relative to the screw fasteners (e.g. eyebolts).

The stringer elements may for example comprise a flexible cord as available from Polyflex Inc. Macon Ga. U.S.A.

Turning to FIG. 12, this figure shows how the restraint means of FIG. 10, may be disposed relative to eyebolt screw fasteners which are in an initial screw tight locking position so as to restrict the rotation of the eyebolts. As seen the end attachment elements each hook on to the loop member of respective eyebolts while the body of the stringer element itself is threaded through the orifices of other intermediate eyebolts. Preferably, the stringer element is under a certain amount or degree of tension.

Once in place as shown in FIG. 12 the restraint means is able to engage either of the axially offset parts 35 or 36 of the eyebolts so as to inhibit rotation of the shank portion of the eyebolts held in the aligned opening. In this way the eyebolts are locked in place. Although vibration may, for example, eventually loosen an eyebolt, a loosened eyebolt will not fall out of the aligned opening since the eyebolt cannot freely rotate and can thus be maintained by the rotational restrain means in screw engagement therewith.

Turning to FIG. 13 this figure shows how the restraint means of FIG. 11, may be disposed relative to eyebolt screw fasteners which are in an initial screw tight locking position so as to restrict the rotation of the eyebolts. Again preferably, the stringer element 46 is under some degree of tension.

Although the restraint means of FIG. 11 has two similar hooks it operates in essentially the same way as the restraint means of FIG. 10 so as to inhibit rotation of the eyebolts and keep them in screw engagement with the aligned opening.

Although the restraint means have been discussed above in relation to flexible stretchable materials, the restraint means may, if desired be made of relatively stiff material (metal, plastic, etc.). Thus the rotational restraint means may comprise a stiff rod having a hook at one end for engaging the loop member of an eyebolt. In this case the rod may be long enough to thread through two or more loo orifices while hooking onto an upper orifice. The lower end need not be attache to anything since the stiff character of the rod will act to inhibit rotation in the absence of such attachment; i.e. in this case the stringer element is a stiff rod member.

As a further alternative the stringer element may comprise a plurality of spaced apart hook members disposed along the length of the stringer element form end to end. In this case, each of the hook members would be configured to engage a respective loop member of an eyebolt or similarly configured member of another screw fastener, i.e. having a hook like feature.

The rotational restraint means may of course be configured so as to engage only one eyebolt at a time. For example, the stringer element may be connected at one end thereof in some suitable way directly to the flexible sheet (e.g. by a releasable hooking mechanism, by a nut and bolt system, glue, etc.). The other end of the stringer element may have a hook (e.g. snap clip hook) for hooking the orifice of the eyebolt or the end of the stringer may be threaded through the orifice and be releasably fixed to the sheet by a hooking mechanism; preferably the stringer element if flexible is under some degree of tension. In this latter case a plurality of stringer elements may be needed to achieve the desired locking effect.

Figure 14:
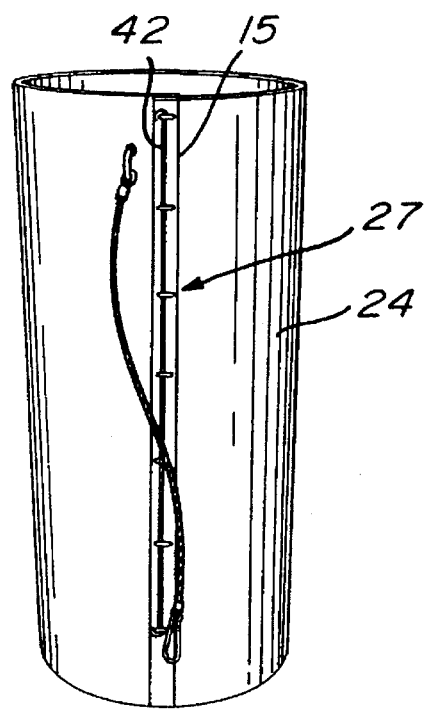
FIG. 14 is a perspective view of an assembled tubular chute using the sheet of FIG. 1, a plurality of eyebolts of FIG. 4 and the stringer element shown in FIG. 10.
Figure 16:
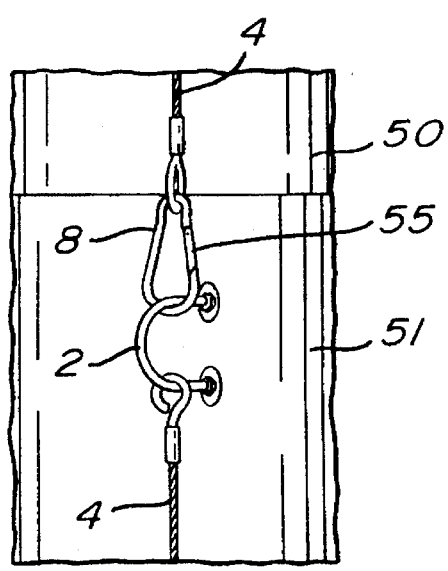
FIG. 16 illustrate an example coupling mechanism whereby a lower chute section may be connected to an upper chute section.

FIG. 14 shows a finished tubular chute section using sheet 1, eyebolts 27 and the restraint means of FIG. 10. The rotational restraint means comprises a single stringer element which extends under tension from the uppermost eyebolt to the lowermost eyebolt.

A plurality of tubular sections such as shown in FIG. 14 may be used to construct a debris conveyor chute. The debris conveyor chute of FIG. 15 thus has tubular sections 50 to 54 each of which is made in accordance with the present invention. As may be appreciated an upper chute nests in the larger opening of a lower chute (i.e. in the opening defined by side 10, see FIG. 1). FIG. 2 illustrates how the support cables are used to interconnect and maintain the chute sections 50 and 51 in place; only U-bolt is shown, the other is similarly connected to the chute 50. As seen the snap clip 8 of an upper cable 4 engages the U-bolt 2 of a lower chute section. The snap-clip 8 has a portion 55 which is pivotally mounted to the rest of the clip in spring bias fashion. The portion 55 is biased to normally remain in the position shown but may under pressure be pivoted inwardly to open a passage whereby the U-bolt may be clipped or hooked by the snap-clip.

Figure 15:
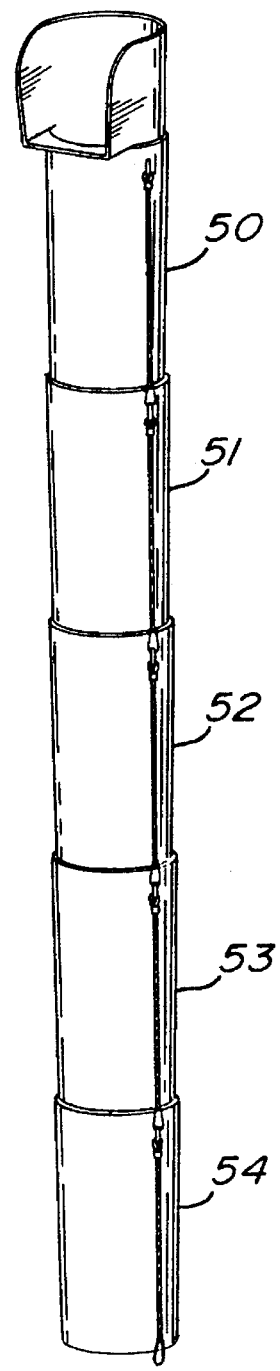
FIG. 15 illustrates a plurality of tubular chutes as shown in FIG. 14 nested one in the other so as to define a debris conveyor chute.

Although the tubular sections as shown in FIG. 15 each have their own separate rotational restraint means, two or more sections may, if desired, share an appropriately sized stringer element i.e. depending on the length of the stringer element.

Once the need for the debris chute is over the tubular chute sections may be separated and then broken down by following the reverse of the steps used to make the sections. The sheets may then be placed on a palette 57 for storage and or transportation as shown in FIG. 17; FIG. 17 shows only one sheet but a plurality may be stacked on the palette.

Although the invention has been described above in relation to a number of example embodiments the various elements thereof may take on any desired form provided that rotational restriction is achievable in the finished chute section. Thus, FIGS. 18 to 31 illustrate examples of other forms which the various elements of the invention may take. For these figures, the previous reference numerals will be used with respect to features common to the above described example embodiments.

Figure 18:
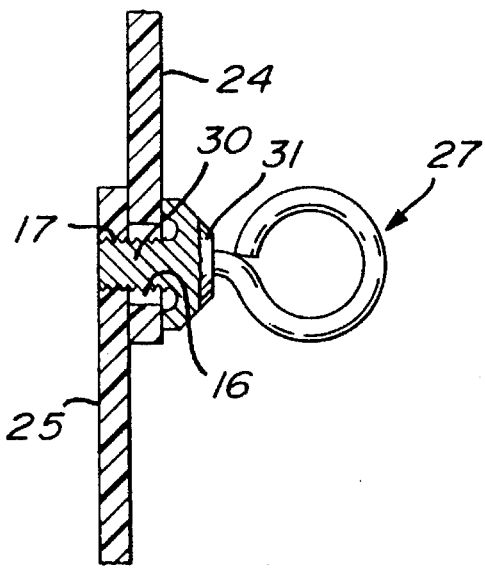
FIG. 18 shows another example in cross section of an aligned opening for holding the shank portion of a screw fastener.

FIG. 18 shows a pair of first and second elements wherein the second opening 16 is sized larger than the shank portion 30 of the eyebolt 27; the second opening while holding the shank does not grasp it in the manner of the first opening. The second opening is, however, sized smaller than the head part 31 so that a pinching action may still be exerted on the second element by the first element and the head part 31.

Figure 19:
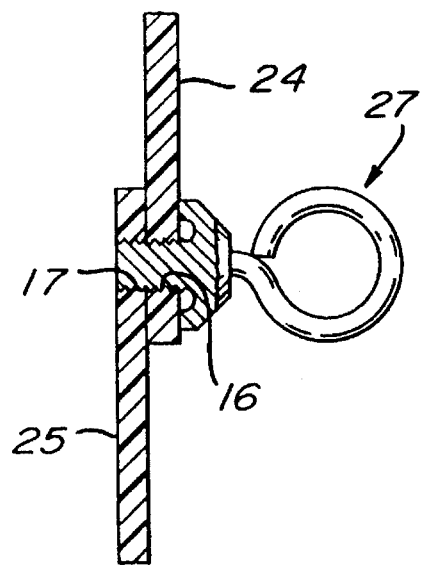
FIG. 19 shows an additional example in cross section of an aligned opening for holding the shank portion of a screw fastener.

The pair of first and second elements shown in FIG. 19 differs from that of FIG. 18 in that the second opening is also provided with a screw thread for screw engagement with the shank 30.

Figure 20:
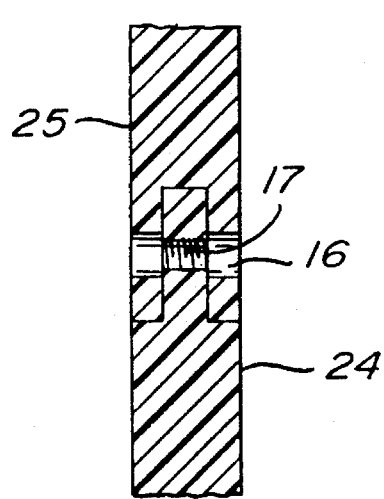
FIG. 20 illustrates another example embodiment in cross section of the form which the opposed edge members may take, the edge member being shown in an adjacent position.

FIG. 20 shows a tongue and groove interconnection between the first and second elements which may form part of or be connected to the first and second edge members.

Figure 21:
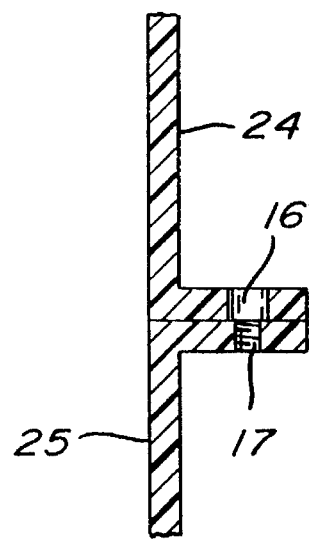
FIG. 21 illustrates a further example embodiment in cross section of the form which the opposed edge members may take, the edge member being shown in an adjacent position.

FIG. 21 illustrates a possible construction wherein the first and second openings are both on the exterior side of the chute; the first and second elements being formed of outwardly extending flanges.

In accordance with the present invention the thread of an opening may be provided by a (known) clip on element; see for example element 62 of FIG. 7 in U.S. Pat. No. 4,023,374 the entire contents of which are incorporated herein by reference.

Both FIG. 20 and 21 show the first and second edge members in a non overlapping adjacent position.

Figure 22:
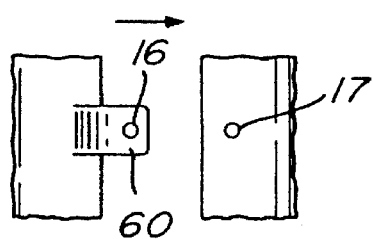
FIG. 22 illustrates in partial top view another example embodiment of a pair of first and second elements connected to respective edge members.
Figure 23:
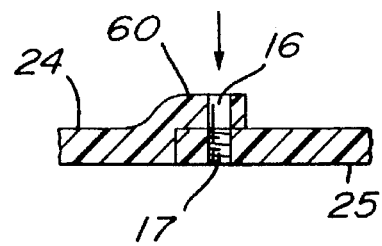
FIG. 23 shows a cross sectional view of the pair of first and second elements illustrated in FIG. 22, in position to define an aligned opening for holding the shank portion of a screw fastener, the edge members being in the required adjacent position.
Figure 24:
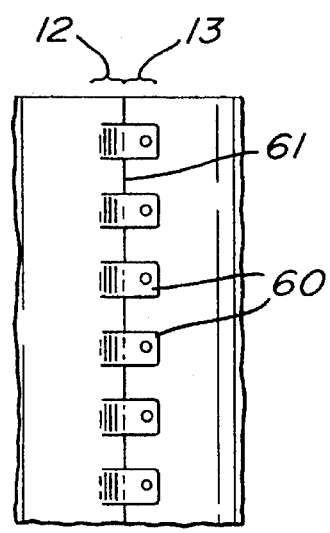
FIG. 24 illustrates in partial side view a plurality of spaced apart pairs of first and second elements as shown in FIG. 22, the first elements being connected to one edge member and the second elements being connected or defined by the other edge member.
Figure 25:
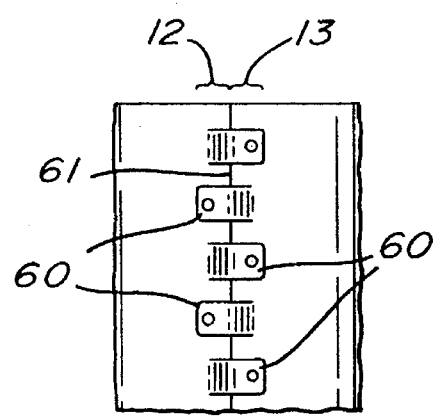
FIG. 25 illustrates a partial side view of a plurality of spaced apart pairs of first and second elements as shown in FIG. 22, some of the first and second elements being connected to one edge member and the other first and second elements being connected to the other edge member.
Figure 26:
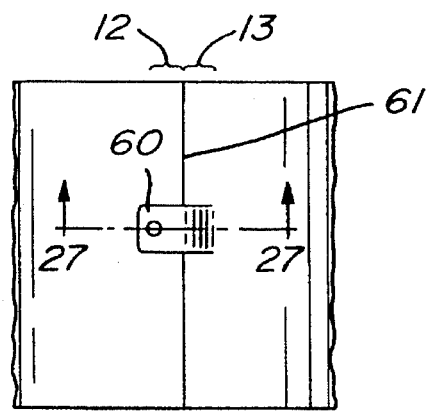
FIG. 26 illustrates a partial side view of a single pair of first and second elements as shown in FIG. 22, fixed to another example of the opposed first and second edge members.
Figure 27:
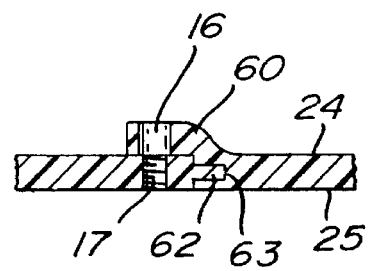
FIG. 27 is a partial cross sectional view along 27—27.
Figure 28:
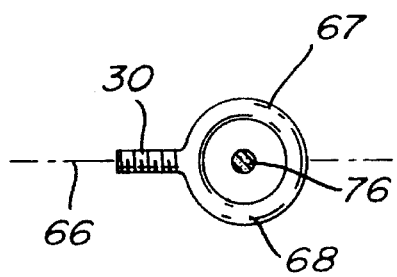
FIGS. 28 to 32 illustrate additional screw fasteners provided with other example forms which the axially offset member(s) may take.
Figure 29:
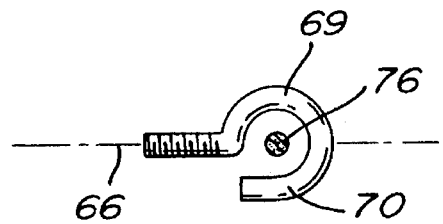
Figure 30:
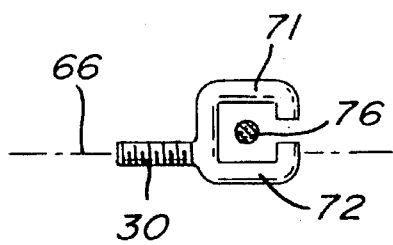

In the above examples the first and second elements have been shown as being merged with the appropriate edge member. One or the other of these elements may, however, comprise a projection connected to an edge member so that the edge members may be disposed in an adjacent essentially non overlapping configuration. FIG. 22 shows a projection 60 connected to the second edge member and defining second opening 16, the first opening 17 being defined by the first edge member. FIG. 23 shows the projection of FIG. 22 disposed so that the openings 16 and 17 are aligned, the first and second edge members essentially abut so as to define a seam. FIGS. 24, 25 and 26 show various configurations of the first and second elements using one or more projections 60, the seam between the edge members being designated by the reference numeral 61. As may be seen from FIG. 25 the projections 60 need not all be connected to the same edge member.

Although a plurality of screw fasteners has been discussed above, if desired only one screw fastener and associated pair of first and second openings may be used. FIG. 26 shows an example chute using one screw fastener. In the example shown the first and second edge members are configured to have a tongue 62 and groove 63 which extend the length of the first and second edge members 12 and 13.

FIGS. 28 to 32 illustrate other forms which the screw fastener may take. The longitudinal axis in each case is designated with the reference numeral 66. The screw fasteners shown in these figures have axially offset members which are designated with the reference numerals 67, 68, 69, 70, 71, 72, 73, 74 and 75. A cross section of a stringer element is shown with the reference numeral 76 (all cases). The fasteners of FIGS. 30 to 32 do not require that the stringer be threaded through an orifice.

Figure 31:
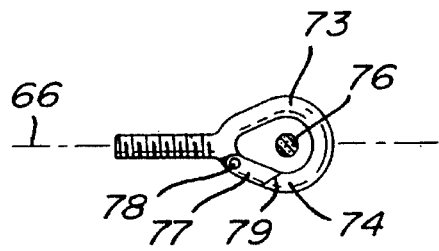
Figure 32:
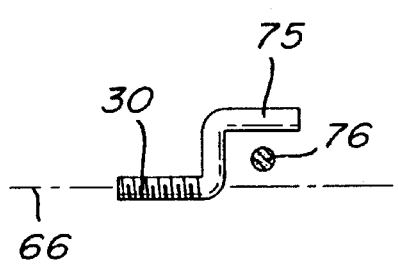

The fastener of FIG. 31 is of the snap-clip type discussed above. The fastener has a pivotally mounted spring biased part 77, part 77 being pivotal about the pivot 78. The part 77 releasably interfaces with the loop member along the abutment interface 79.

As in the case of the eyebolt fastener described above the stringer element is disposed so as to engage the offset member so that it interferes with the cranking action of the offset member and thus inhibits rotation of the shank 30.

I claim:

1. A kit for the construction of a rebuildable open-ended tubular section, said kit comprising
a flexible sheet,
said sheet having a pair of opposed edge members, said sheet being configured to be rolled up such that said edge members are able to be disposed in an adjacent position wherein said sheet defines an open-ended tubular section, said tubular section having an interior side and an exterior side, and
screw interlocking means for releaseably joining said first and second edge members together in said adjacent position,
said screw interlocking means comprising
a plurality of screw fasteners, and
a plurality of pairs of first and second elements,
said screw interlocking means being configured such that for each pair of said elements, one edge member comprises the first element of the pair and the other edge member comprises the second element of the pair,
each screw fastener comprising a head portion and a screw threaded shank portion, said shank portion having a longitudinal axis,
each first element comprising a first opening,
each second member comprising a second opening,
each first opening having a screw thread for screw engagement with the screw threaded shank portion of a respective screw fastener, each second opening being sized smaller than the head portion of a respective screw fastener,
the first and second elements of each of said pairs of elements being configured and disposed such that the second opening is alignable with a respective first opening so as to define an aligned opening for holding the shank portion of a respective screw fastener, and
that the second element may be disposed on the exterior side of said tubular chute and the shank portion of a respective screw fastener may enter the aligned opening so as to dispose said second element between the respective first element and the head portion of the respective screw fastener when the shank portion of said respective screw fastener is held in the aligned opening,
characterized
in that one or more screw fasteners has a pair of opposed, spaced apart, axially offset members projecting from the head portion thereof, said axially offset members being axially offset relative to the longitudinal axis of the shank portion of a respective screw fastener, and
in that said kit includes
rotational restraint means for inhibiting the rotation of said one or more of screw fasteners when the shank portion thereof is in screw engagement with a respective first opening, said rotational restraint means being able to engage either or both offset members of a said pair of offset members of a screw fastener for inhibiting the rotation thereof.

2. A kit as defined in claim 1 wherein said rotational restraint means comprises
a stringer element, and
immobilization means for immobilizing said stringer element relative to said one or more screw fasteners,
and wherein the head portion of said one or more screw fasteners, said stringer element and said immobilization means are configured such that, when the threaded shank portion of said one or more screw fasteners is engaged in a respective aligned opening,
the stringer element may be disposed between the pair of axially offset members of said one or more screw fasteners such that each offset member of a said pair of offset members is able to engage said stringer element so as to restrain rotation of the threaded shank portion of a respective screw fastener.

3. A kit as defined in claim 1 wherein the second openings are sized larger than the shank portion of the screw fastener.

4. A kit as defined in claim 1 characterized in that said screw fasteners comprise a plurality of eyebolts, each eyebolt comprising a head portion and a screw threaded shank portion, the head portion of each eyebolt having a loop member defining an orifice.

5. A kit as defined in claim 1 wherein one or more of the second openings has a screw thread for screw engagement with the screw threaded shank portion of a respective fastener.

6. A kit as defined in claim 1 wherein a portion of each first opening is defined by a sleeve member which is configured such that, when the edge members are disposed in said adjacent position, the sleeve member extends into the respective second opening.

7. A kit as defined in claim 6 wherein said sleeve member is configured such that, when the edge members are disposed in said adjacent position, the sleeve member extends through and projects out of said respective second opening.

8. A kit as defined in claim 1 wherein the head portion of each of said screw fasteners has an annular abutment surface disposed about said shank portion and wherein for each screw fastener, the head portion thereof is configured such that when the shank portion of the screw fastener is screwed into a respective aligned opening, said abutment surface may abut a respective second element and urge said second element against the respective first element, so as to clamp said second element between said head portion and said first element.

9. A kit for the construction of a rebuildable open-ended tapered tubular section,
said kit comprising
a flexible sheet,
said sheet having a first edge member and an opposed second edge member, said sheet being configured to be rolled up such that said edge members are able to be disposed in an overlapping position wherein said sheet defines an open-ended tapered tubular section, said tubular section having an interior side and an exterior side, and
screw interlocking means for releaseably joining said first and second edge members together in said overlapping position, said screw interlocking means comprising
a plurality of screw fasteners,
a plurality of first openings, said first openings being defined by and being disposed along one of said edge members,
and a plurality of spaced apart second openings, said second openings being defined by and being disposed along the other of said edge members,
each screw fastener comprising a head portion and a screw threaded shank portion,
each first opening having a screw thread for screw engagement with the screw threaded shank portion of a respective screw fastener,
each second opening being sized smaller than the head portion of a respective screw fastener,
said first and second edge members being configured such,
that each of the second openings is able to be aligned with a respective first opening so as to define a respective aligned opening for holding the shank portion of a respective screw fastener, and
that the second edge member may be disposed on the exterior side of said tubular chute and the shank portion of each screw fastener may enter a respective aligned opening so as to dispose said second edge member between the first edge member and the head portion of each of the screw fasteners when the shank portion of each of the screw fasteners is held in a respective aligned opening,
characterized
in that said screw fasteners comprise one or more eyebolts, each eyebolt comprising a head portion and a screw threaded shank portion, the head portion of each eyebolt having a loop member defining an orifice, and
in that said kit includes
rotational restraint means for inhibiting the rotation of one or more of said eyebolts when the shank portion thereof is in screw engagement with a respective first opening, said rotational restraint means being able to engage the loop member defining the orifice of said one or more eyebolts for inhibiting the rotation thereof.

10. A kit as defined in claim 9 wherein said rotational restraint means comprises
a stringer element, and
immobilization means for immobilizing said stringer element relative to said one or more eyebolts,
and in that the head portion of each of said one or more eyebolts, said stringer element and said immobilization means are configured such that, when the threaded shank portion of said one or more eyebolts is engaged in a respective aligned opening,
the stringer element may be threaded through the orifice of said one or more eyebolts so as to restrain rotation of the threaded shank portion of said one or more eyebolts in screw engagement with a respective first opening.

11. A kit as defined in claim 9 wherein the second openings are sized larger than the shank portion of the respective screw fasteners.

12. A kit as defined in claim 9 wherein one or more of the second openings has a screw thread for screw engagement with the screw threaded shank portion of a respective eyebolt.

13. A kit as defined in claim 10 wherein said stringer element is flexible.

14. A kit as defined in claim 13 wherein said stringer element has opposed ends, and said immobilization means comprises hook means provided at each end of the stringer element for engaging an orifice of a respective eyebolt.

15. A kit as defined in claim 9 wherein a portion of one or more of the first openings is defined by a sleeve member which is configured such that, when the edge members are disposed in said overlapping position, the sleeve member extends into a respective second opening.

16. A kit as defined in claim 15 wherein said one or more sleeve members are configured such that, when the edge members are disposed in said overlapping position, the sleeve member extends through and projects out of said respective second opening.

17. A kit as defined in claim 9 wherein the head portion of each of said eyebolts has an annular abutment surface disposed about said shank portion and wherein for each eyebolt, the head portion thereof is configured such that when the shank portion of the eyebolt is screwed into a respective aligned opening, said abutment surface may abut a respective second element and urge said second element against the respective first element, so as to clamp said second element between said head portion and said first element.

18. A kit as defined in claim 16 wherein the head portion of each of said eyebolts has an annular abutment surface disposed about said shank portion and wherein for each eyebolt, the head portion thereof is configured such that when the shank portion of the eyebolt is screwed into a respective aligned opening, said abutment surface may abut a respective second element and urge said second element against the respective first element, so as to clamp said second element between said head portion and said first element.

* * * * *